United States Patent
BuBshait et al.

(10) Patent No.: US 11,125,644 B2
(45) Date of Patent: Sep. 21, 2021

(54) MECHANICAL SEAL TESTING

(71) Applicant: Saudi Arabian Oil Company, Dhahran (SA)

(72) Inventors: Ibrahim S. BuBshait, Al Ahsa (SA); Nayif I. Khonaifer, Al Ahsa (SA); Abdullah N. Khudhayr, Al Ahsa (SA); Ahmad A. Mijhed, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 79 days.

(21) Appl. No.: 16/726,601

(22) Filed: Dec. 24, 2019

(65) Prior Publication Data
US 2021/0190628 A1  Jun. 24, 2021

(51) Int. Cl.
*G01M 3/28* (2006.01)
*G01M 13/005* (2019.01)

(52) U.S. Cl.
CPC ........ *G01M 3/2869* (2013.01); *G01M 13/005* (2013.01)

(58) Field of Classification Search
CPC .... G01M 3/2869; G01M 13/005; G01M 3/00; G01M 13/00
See application file for complete search history.

(56) References Cited

U.S. PATENT DOCUMENTS

| | | |
|---|---|---|
| 4,750,360 A | 6/1988 | Smith |
| 5,383,351 A | 1/1995 | Kotlyar |
| 8,096,169 B2 | 1/2012 | Bearden et al. |
| 2007/0151086 A1* | 7/2007 | Hayes .................. G01M 13/005 29/407.05 |
| 2016/0146681 A1* | 5/2016 | Sun ..................... G01M 13/005 73/862.191 |

FOREIGN PATENT DOCUMENTS

| | | |
|---|---|---|
| CN | 203551200 | 4/2014 |
| CN | 105527081 | 4/2016 |
| CN | 106226059 | 12/2016 |
| EP | 0220562 | 5/1987 |
| KR | 101490290 | 1/2015 |
| RU | 176941 | 2/2018 |

OTHER PUBLICATIONS

Buchdahl et al., "Mechanical Seals Qualification Procedure of the Main Pumps of Nuclear Power Plants in France," Procedure de Qualification Des Garnitures Mechaniques Des Pompes Principales Des Centrales Nucleaires Pracaises, Dec. 1992, 15 pages.
Ienina and Kim, "Test Apparatus Design for Identifying Leakage Flow and Rotordynamic Coefficients of the Flexible Floating Ring Seal with a Bump," 2012, 2 pages.
PCT International Search Report and Written Opinion in International Appln. No. PCT/US2020/065938, dated Apr. 1, 2021, 14 pages.

* cited by examiner

*Primary Examiner* — David Z Huang
(74) *Attorney, Agent, or Firm* — Fish & Richardson P.C.

(57) ABSTRACT

A mechanical seal testing system includes a mounting ring and a testing table. The mounting ring includes a first side configured to couple to a mechanical seal, the mechanical seal configured to couple to an oil pump, and a second side configured to couple to a stuffing box, the stuffing box configured to couple to a water pump. The testing table includes a surface configured to collect fluid leaked by the mechanical seal or the stuffing box. The mounting ring is coupled to the surface of the testing table.

20 Claims, 4 Drawing Sheets

MECHANICAL SEAL TESTING

TECHNICAL FIELD

This disclosure relates to systems and methods for testing mechanical seals.

BACKGROUND

Mechanical seals can be used in a variety of applications for containing fluid within a vessel. Mechanical seals can be tested to ensure proper performance of the mechanical seals prior to implementing the mechanical seals in specific system or application. Replicating the stresses placed on the seals in many types of systems and field installations improves effectiveness of mechanical testing techniques.

SUMMARY

In an example implementation, a mechanical seal testing system includes a mounting ring and a testing table. The mounting ring includes a first side configured to couple to a mechanical seal, the mechanical seal configured to couple to an oil pump, and a second side configured to couple to a stuffing box, the stuffing box configured to couple to a water pump. The testing table includes a surface configured to collect fluid leaked by the mechanical seal or the stuffing box. The mounting ring is coupled to the surface of the testing table.

This, and other implementations, can include one or more of the following features. The surface of the testing table can define an opening coupled to a drain line, the opening configured to channel fluid collected on the surface to the drain mile. The mechanical seal testing system can further include a plurality of mechanical fasteners configured to affix the stuffing box and the mechanical seal to the mounting ring. The mechanical seal testing system can further include a controller communicably coupled to the water pump and the oil pump, the controller configured to control a fluid pressure provided by the water pump to the stuffing box and a fluid pressure provided by the oil pump to the mechanical seal. The controller can be configured to control the fluid pressure provided by the water pump to the stuffing box and the fluid pressure provided by the oil pump to the mechanical seal independently. The mechanical seal testing system can further include a first pressure sensor coupled to a first fluid line, the first fluid line fluidly coupling the water pump to the stuffing box, the first pressure sensor configured to measure a pressure in the first fluid line, and a second pressure sensor coupled to a second fluid line, the second fluid line fluidly coupling the oil pump to the mechanical seal, the second pressure sensor configured to measure a pressure in the second fluid line. The first pressure sensor can be communicably coupled to the controller and configured to transmit signals to the controller indicating the fluid pressure in the first fluid line, and the second pressure sensor can be communicably coupled to the controller and configured to transmit signals to the controller indicating the fluid pressure in the second fluid line. The mechanical seal testing system can further include a dashboard coupled to the testing table. The dashboard can include a first pressure gauge coupled to the first pressure sensor and configured to display the fluid pressure in the first fluid line, and a second pressure gauge coupled to the second pressure sensor and configured to display the fluid pressure in the second fluid line. The dashboard can further include a first control valve fluidly coupled to the first fluid line and configured to control a flow of fluid through the first fluid line, and a second control valve fluidly coupled to the second fluid line and configured to control a flow of fluid through the second fluid line.

In some implementations, a mechanical seal testing method includes applying a fluid pressure to a mechanical seal attached to a first side of a mounting ring, applying a fluid pressure to a stuffing box attached to a second side of the mounting ring, the second side opposite the first side, and monitoring the mechanical seal and the stuffing box to detect leaks at the mechanical seal.

This, and other implementations, can include one or more of the following features. Applying a fluid pressure to the mechanical seal can include controlling an oil pump to flow oil from the oil pump to the mechanical seal through a fluid line attached to the mechanical seal to apply a pressure to a barrier side of the mechanical seal. Applying a fluid pressure to the stuffing box can include controlling a water pump to flow water from the water pump to the stuffing box through a fluid line attached to the stuffing box, wherein the fluid pressure applied to the stuffing box is transferred through the mounting ring and, in response, the mounting ring applies a pressure to a process side of the mechanical seal. Applying a fluid pressure to the mechanical seal can include controlling an oil pump to flow oil from the oil pump to the mechanical seal through a first fluid line attached to the mechanical seal until a pressure sensor coupled to the first fluid line detects that the pressure in the mechanical seal is equal to a first target pressure. Applying a fluid pressure to the stuffing box can include controlling a water pump to flow water from the water pump to the stuffing box through a second fluid line attached to the stuffing box until a pressure sensor coupled to the second fluid line detects that the pressure in the stuffing box is equal to a second target pressure. The fluid pressure applied to the mechanical seal and the fluid pressure applied to the stuffing box can be applied simultaneously. In some implementations, the fluid pressure applied to the mechanical seal is not equal to the fluid pressure applied to the stuffing box. The mechanical seal testing method can further include adjusting at least one of the fluid pressure applied to the mechanical seal and the fluid pressure applied to the stuffing box, and monitoring the mechanical seal and the stuffing box to detect leaks at the mechanical seal at the adjusted fluid pressure. Monitoring the mechanical seal and the stuffing box to detect leaks at the mechanical seal can include monitoring a pressure in a first fluid line coupled to the mechanical seal, a decrease in pressure in the first fluid line indicating a leak on a barrier side of the mechanical seal, and monitoring a pressure in a second fluid line coupled to the stuffing box, a decrease in pressure in the second fluid line indicating a leak on a process side of the mechanical seal. Monitoring the mechanical seal and the stuffing box to detect leaks at the mechanical seal can include isolating the mechanical seal from a pump applying pressure to the mechanical seal, and isolating the stuffing box from a pump applying pressure to the stuffing box. The mechanical seal testing method can further include collecting fluid leaked by the mechanical seal or the stuffing box onto a surface of a testing table, the mounting ring coupled to the testing table, and directing the leaked fluid through an opening in the surface of the testing table, the opening coupled to a drain line.

In some implementations, a mechanical seal testing system includes a mounting ring, a testing table, an oil pump, and a water pump. The mounting ring includes a first side configured to couple to a mechanical seal and a second side configured to couple to a stuffing box. The testing table includes a surface configured to collect fluid leaked by the mechanical seal or the stuffing box. The mounting ring is coupled to the surface of the testing table. The oil pump is configured to fluidly couple to and pressurize the mechanical seal. The water pump is configured to fluidly couple to and pressurize the stuffing box.

Example implementations of the present disclosure can include one, some, or all of the following features. For example, a mechanical seal testing system or method according to the present disclosure can improve mechanical seal testing by allowing for both a process side and a barrier side of a mechanical seal to be tested simultaneously. In addition, a system according to the present disclosure enables testing of the mechanical seal for leaks under a variety of differential pressures commonly applied to mechanical seals used in industrial pumps. By allowing pressure to be applied to both sides of a mechanical seal simultaneously, a system according to the present disclosure enables the spring tension distribution and opening and closing forces of a mechanical seal to be tested. A system according to the present disclosure also enables pressure testing of a mechanical seal using a variety of test media, such as water, oil, and air. Testing a mechanical seal using a system or method according to the present disclosure can reduce the likelihood of installing a defective seal, which can thus reduce the need for field maintenance.

The details of one or more implementations of the disclosure are set forth in the accompanying drawings and the description below. Other features, objects, and advantages of the disclosure will be apparent from the description and drawings, and from the claims.

DETAILED DESCRIPTION

The present disclosure describes a method and system for testing a mechanical seal. In some implementations, the method and system provide for improved mechanical seal testing by providing simultaneous testing of both sides of the mechanical seal. In some implementations, the testing system includes a table, a circular mounting ring for coupling to a mechanical seal on a first side and to a stuffing box on the second (opposite) side. The table includes an opening with a connection to a drain line to collect and drain off any fluids that leak from the mechanical seal system during testing.

The testing system can also include water and oil pumps fluidly connected to the stuffing box and the mechanical seal, respectively, to pressurize the stuffing box and the mechanical seal. Fluid pressure can be applied to the stuffing box and the mechanical seal either simultaneously or independently. As such, the testing system allows for both the "process side" of the mechanical seal and "barrier side" of the mechanical seal to be tested for leaks simultaneously or independently.

Figure 1:
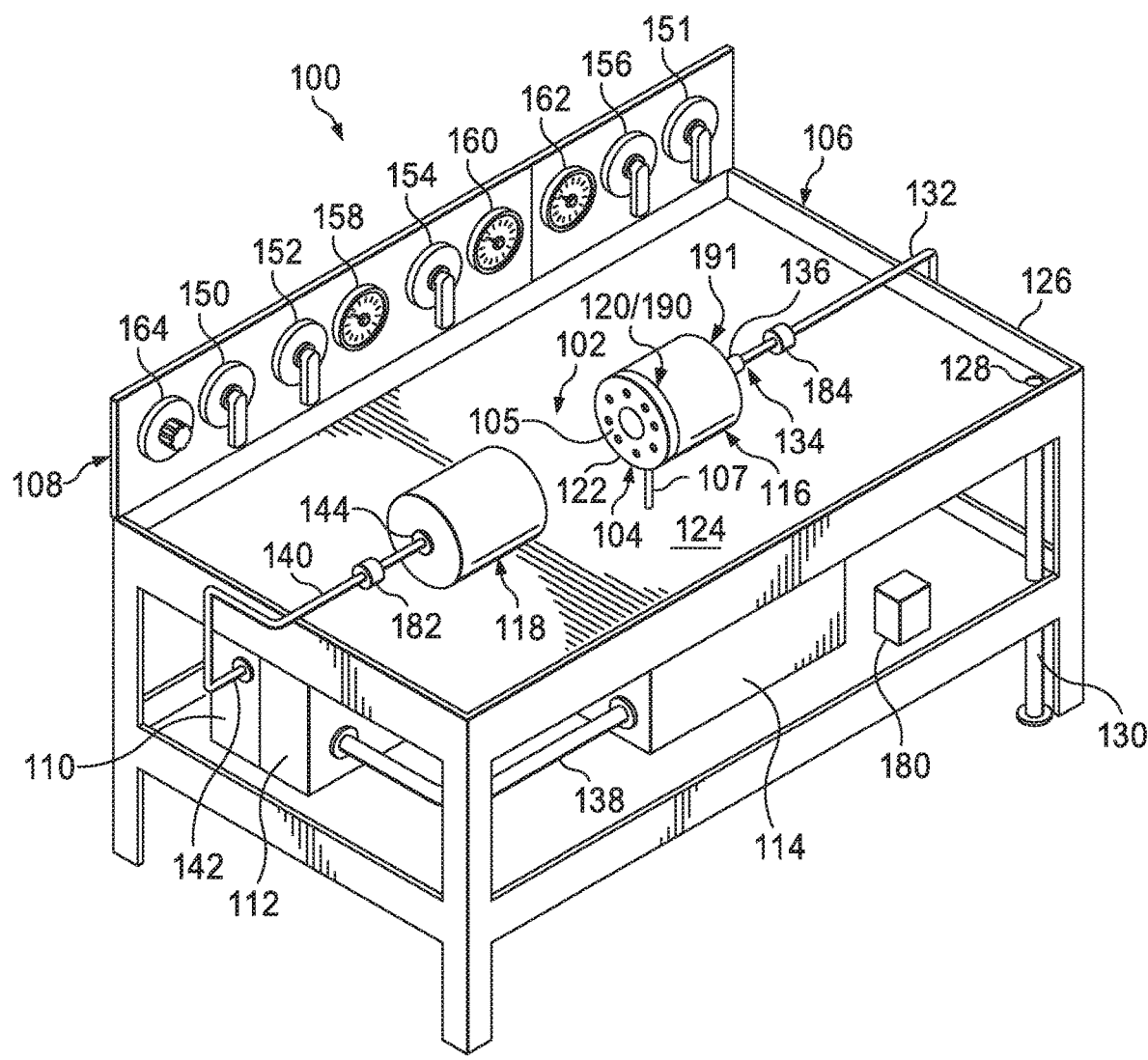
FIG. 1 is a schematic illustration of an example mechanical seal testing system according to the present disclosure.

FIG. 1 depicts an example system 100 for testing a mechanical seal 116. As depicted in FIG. 1 the example testing system 100 includes a mounting ring 104, a stuffing box 118, a testing table 106, a control dashboard 108, a first fluid pump 110, a second fluid pump 112, and a control system 180.

The testing system 100 can be used to statically test new mechanical seals 116 or refurbished mechanical seals 116 to determine seal integrity. The effectiveness of a seal repair can be determined by testing a refurbished mechanical seal 116 using the testing system 100.

In some implementations, the mechanical seal 116 being tested by the testing system 100 is a tandem seal. For example, the mechanical seal 116 tested using the testing system 100 can include two internal sealing sections, a primary sealing section and a secondary sealing section, that are arranged in series with one another. Due to the arrangement of primary and secondary sealing sections of the mechanical seal 116 in series, the sealing sections of the mechanical seal 116 form a closed system when fluid is provided to the mechanical seal 116 and the mechanical seal 116 is pressurized. In some implementations, the primary and secondary sealing sections are arranged in series on the barrier side of the mechanical seal 116 with the primary sealing section facing the process side of the mechanical seal 116. In this arrangement, the secondary sealing section can act as a back-up for sealing the process side of the mechanical seal 116 if the primary sealing section fails.

The mechanical seal 116 tested by the system 100 can include various components, such as a flange, one or more sleeves, seal faces on each end of the seal 116, an O-ring, and one or more springs. For example, the mechanical seal 116 can include a set of springs that are used to maintain the required closing forces of the mechanical seal 116. The mechanical seal 116 can include a flange that is positioned along the outer circumference of the mechanical seal 116 proximate the process side 190 of the mechanical seal 116, and can be used for coupling the mechanical seal 116 to the mounting ring 104 of the testing system 100. The mechanical seal 116 can include a seal face disposed on a process side 190 of the mechanical seal 116 and a seal face disposed on a barrier side 191 of the mechanical seal 116. The mechanical seal 116 can also include one or more ports, such as port 136 depicted in FIG. 1. For example, pressurized fluid can be provided to and enter the mechanical seal 116 through the one or more ports 136 to fill and pressurize the barrier mechanical seal 116.

In some implementations, the mechanical seal 116 tested using this system 100 is a mechanical seal used in an industrial pump, such as a pump designed for pumping hazardous fluids. In some implementations, when the mechanical seal 116 is implemented in an industrial pump, the mechanical seal 116 is installed in a housing, such as a stuffing box, of the pump. For example, when the mechanical seal 116 is installed in a pump, a stuffing box of the pump forms a chamber around the process side 190 mechanical seal 116, and the stuffing box of the pump is filled with fluid (such as, water) to apply pressure to the process side 190 of the mechanical seal.

As depicted in FIG. 1, the testing system 100 includes a stuffing box 118. The stuffing box 118 of the testing system 100 is similar in construction to a type of stuffing box used to house a mechanical seal 116 when the mechanical seal 116 is installed in an industrial pump. The stuffing box 118 includes a chamber that is configured to be filled with fluid and pressurized. As depicted in FIG. 1, the stuffing box 118 includes one or more ports 146, and pressurized fluid can enter the stuffing box 118 through the one or more ports 146 to fill and pressurize the stuffing box 118. As will be described in further detail herein, the stuffing box 118 of the testing system 100 is mounted on the mounting ring 104 opposite the mechanical seal 116, and can be pressurized in order to apply a pressure through the mounting ring to the process side 190 of the mechanical seal 116.

As depicted in FIG. 1, the testing table 106 of the testing system 100 includes a surface 124 and an outer lip 126 surrounding the table surface 124. The outer lip 126 extends upwards from the perimeter of the surface 124 to create a barrier around the surface 124. As depicted in FIG. 1, the surface defines an opening 128 through the testing table 106 that is connected to a drain line 130. Together the surface 124 and outer lip 126 are configured to collect any fluid that is leaked onto the surface 124 and channel the fluid to the drain line 130 via the opening 128 through the surface 124 of the testing table 106. The testing table 106 can be made of a material that is resistant to corrosion by fluids that leak or flow onto the table, such as a metal material. In some implementations the testing table 106 is a stainless steel table. In some implementations, as depicted in FIG. 1, the surface 124 of the testing table 106 has a rectangular shape, a circular shape, or a square shape.

As depicted in FIG. 1, the testing system 100 also includes a mounting ring 104. The mounting ring 104 includes an upper portion 105 having a circular or oval shape, and a lower portion 107 coupled to the upper portion 105. The lower portion 107 of the mounting ring 104 is coupled to the surface 124 of the testing table 106. In some implementations, the mounting ring is welded to the surface 124 of the testing table 106. In some implementations, the mounting ring 104 is formed of a metal, such as carbon steel or stainless steel.

The mounting ring 104 is configured to couple to the mechanical seal 116 and the stuffing box 118. For example, as depicted in FIG. 1, a first side 120 of the mounting ring 104 is configured to couple to the mechanical seal 116 and a second side 122 of the mounting ring 104 is configured to couple to the stuffing box 118. The mechanical seal 116 and the stuffing box 118 can be attached to the mounting ring using one or more mechanical fasteners, such as studs and bolts. In some implementations, the mechanical seal 116 is attached to the mounting ring 104 by inserting one or more fastening mechanisms through openings in a flange of the mechanical seal 116 and into corresponding openings in the mounting ring 104. In some implementations, an O-ring is positioned between the mechanical seal 116 and the mounting ring 104. Similarly, in some implementations, an O-ring is positioned between the stuffing box 118 and the mounting ring 104. The mounting ring 104 is positioned on the testing table 106 such that the mechanical seal 116 and stuffing box 118 are positioned over the testing table when coupled to the mounting ring 104.

The upper portion of the mounting ring 104 is impermeable to fluid flow, such that fluid applied to either the mechanical seal 116 or the stuffing box 118 cannot flow through the mounting ring 104 to the opposite side of the mounting ring 104. Further, as fluid is applied to the stuffing box 118 and pressure increases within the stuffing box 118, the fluid pressure applied to the stuffing box 118 is transferred to the mounting ring 104, which then transfers pressure to the process side 190 of the mechanical seal 116 coupled to the mounting ring 104.

As will be described in further detail herein, the mechanical seal 116 is fluidly coupled to the second fluid pump 112 of the testing system 100 through an oil fluid line 132. As depicted in FIG. 1, a first end (not pictured) of the oil fluid line 132 is connected to the second fluid pump 112, and a second end 134 of the oil fluid line 132 is coupled to a port 136 on the mechanical seal 116. During testing, the second fluid pump 112 can be operated to pump oil to the mechanical seal 116 in order to generate a specified fluid pressure within the mechanical seal 116 and apply pressure to the barrier side 191 of the mechanical seal 116.

In some implementations, the second fluid pump 112 is an oil pump and is fluidly coupled to an oil tank 114 through an oil intake line 138. During operation of the second fluid pump 112, the second fluid pump 112 can draw fluid from the oil tank 114 through the oil intake line 138 and pump oil through the oil fluid line 132 to the mechanical seal 116. In some implementations, the oil tank 114 is fluidly coupled to the drain line 130 such that oil leaked from mechanical seal 116 and collected by the drain line 130 can be recirculated through the system 100. In some implementation, as depicted in FIG. 1, the oil tank 114 is coupled to the testing table 106 below the surface 124 of the table 106. In some implementations, the second fluid pump 112 is configured to flow other fluids, such as water, air, or pressurized gases, through the oil fluid line 132 to the mechanical seal 116 in order to pressurize the mechanical seal 116.

Similarly, the stuffing box 118 is fluidly coupled to the first fluid pump 110 through a water line 140. As depicted in FIG. 1, a first end 142 of the water line 140 is coupled to the first fluid pump 110 and a second end 144 of the water line 140 is coupled to a port 146 on the stuffing box 118. During testing, the first fluid pump 110 can be operated to pump water to the stuffing box 118 in order to generate a specified fluid pressure within the stuffing box 118. The fluid pressure within the stuffing box 118 is then transferred to the mounting ring 104, and, in response, the mounting ring 104 applies pressure to the process side 190 of the mechanical seal 116.

In some implementations, the first fluid pump 110 is a water pump and is fluidly coupled to a water source (not pictured) through a water intake line (not pictured). During operation of the first fluid pump 110, the first fluid pump 110 can draw water from the water source through the water intake line, and pump the water through the water line 140 to the stuffing box 118. In some implementations, the first fluid pump 110 is configured to flow other fluids, such as oil, air, or pressurized gases, through the water line 140 to the stuffing box 118 in order to pressurize the stuffing box 118. In some implementations, each of the first and second pumps 110, 112 is configured to pump an immiscible fluid, such as water or oil.

As depicted in FIG. 1, in some implementations, the first fluid pump 110 and the second fluid pump 112 are each coupled to the testing table 106 below the surface 124 of the testing table 106. In some implementations, positioning the fluid pumps 110, 112 below the surface 124 of the testing table 106 reduces the space required to house the testing system 100 and provides a more compact testing system 100. Any suitable type of pumps, such as hydraulic pumps, including piston pumps, screw pumps, and gear pumps, can be used for the first fluid pump 110 and second fluid pump 112. In some implementations, a single pump can be used to pressurize both the stuffing box 118 and mechanical seal 116. For example, each of the fluid lines 132, 140 coupled to the mechanical seal 116 and the stuffing box 118, respectively, can be coupled to a single pump, which can be operated to pump fluid to each of the mechanical seal 116 and the stuffing box 118 to apply pressure to both sides of the mechanical seal 116

In some implementations, the first and second fluid pumps 110, 112 each include an internal relief system (not shown) configured to prevent over pressurization of the mechanical seal 116 and the stuffing box 118. For example, in some implementations, the internal relief system of the second fluid pump 112 automatically drains fluid from the oil fluid line 132 in response to a pressure sensor 184 along the oil fluid line 132 detecting that the pressure in the oil fluid line 132 exceeds a threshold pressure. Similarly, in some implementations, the internal relief system of the first fluid pump 110 automatically drains fluid from the water line 140 in response to a pressure sensor 182 along the water line 140 detecting that the pressure in the water line 140 exceeds a threshold pressure. In some implementations, the internal relief system includes a valve body, a poppet or disc, and one or more springs.

As described in further detail herein, the first fluid pump 110 and second fluid pump 112 can each be operated independently to provide a particular pressure to the stuffing box 118 and mechanical seal 116, respectively, in order to apply a particular pressure the process side 190 of the mechanical seal 116 and barrier side 191 of the mechanical seal 116, respectively. In addition, the first fluid pump 110 and second fluid pump 112 can be operated simultaneously to more closely simulate the pressure applied to the mechanical seal 116 when installed in an industrial pump by simultaneously applying pressure to the stuffing box 118 and mechanical seal 116, which in turn simultaneously applies pressure to the process side 190 and barrier side 191 of the mechanical seal 116.

As depicted in FIG. 1, the testing system 100 includes a control dashboard 108 coupled to the testing table 106. An operator of the testing system 100 can use the control dashboard 108 to operate the fluid pumps 110, 112 and control the pressure applied to the mechanical valve 116 and stuffing box 118. In some implementations, the control dashboard 108 is communicably coupled to a control system 180, and the control system 180 can control the control dashboard 108.

The control system 180 can be a microprocessor-based, mechanical, or electromechanical controller, as some examples. The control system 180 can be implemented as a computer system that includes one or more processors and a computer-readable medium storing instructions executable by the one or more processors to perform operations described here. Alternatively or in addition, the control system 180 can be implemented as processing circuitry, firmware, hardware, software or combinations of them with or independent of the computer system.

Figure 2:
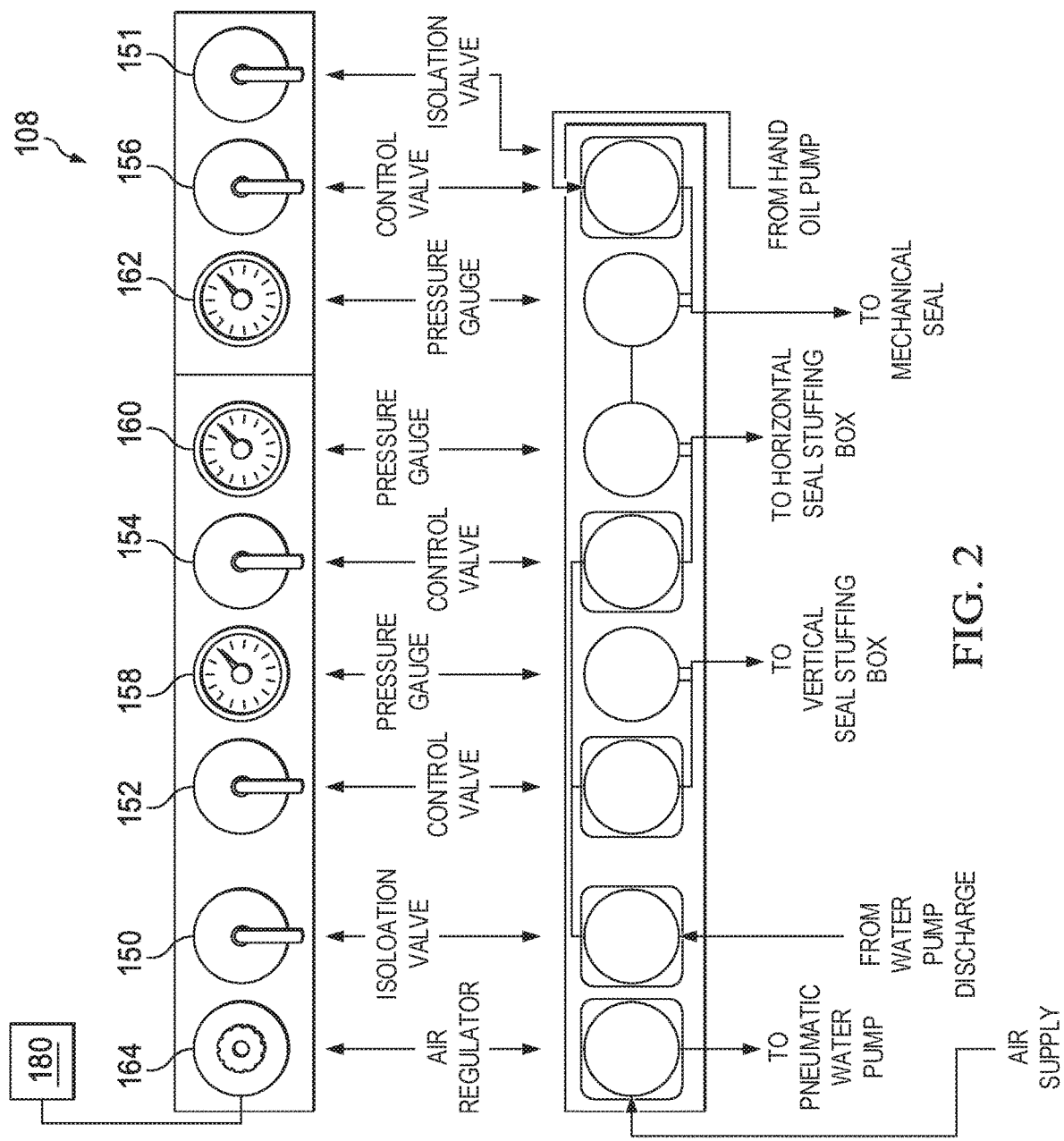
FIG. 2 is a schematic illustration of an example control dashboard of the testing system of FIG. 1.

FIG. 2 depicts an example schematic of the control dashboard 108 of the testing system 100 depicted in FIG. 1. As depicted in FIG. 2, the control dashboard 108 includes a pair of isolation valves 150, 151, multiple flow control valves 152, 154, 156, multiple pressure gauges 158, 160, 162, and an air regulator 164.

The air regulator 164 is fluidly coupled to each of the fluid pumps 110, 112 and is configured to control the pressurized air or gas supplied to each of the fluid pumps 110, 112. For example, in some implementations, each of the fluid pumps 110, 112 are pneumatic pumps, and controlling the air pressure provided to each of the fluid pumps 110, 112 via the air regulator 164 controls the movement of each of the fluid pumps 110, 112. In some implementations, the air regulator 164 is controlled by the control system 180 to regulate the pressurized gas provided to each of the fluid pumps 110, 112 in order to control the movement of the fluid pumps 110, 112. In some implementations, the air regulator 164 can be manually operated by an operator of the testing system 100 to control the stream of pressurized gas provided to each of the fluid pumps 110, 112 in order to control the movement of the fluid pumps 110, 112.

As depicted in FIG. 2, the dashboard 108 includes a first isolation valve 150 and a second isolation valve 151. The first isolation valve 150 is fluidly coupled to the first fluid pump 110 of the testing system 100 and is communicably coupled to the control system 180 (for example, through a control line). In some implementations, the first isolation valve 150 is configured to be operated by the control system 180 to selectively engage or disengage to control flow from the first fluid pump 110 through the water line 140 to the stuffing box 118. For example, engaging the first isolation valve 150 prevents fluid flow from the first fluid pump 110 into the stuffing box 118 in order to isolate the stuffing box 118 from the first fluid pump 110. In addition, by engaging the first isolation valve 150, the pressure within the stuffing box 118 is maintained. As a result, the pressure applied to the process side 190 of the mechanical seal via the pressure applied to the mounting ring 104 by the stuffing box 118 is maintained.

In some implementations, the first isolation valve 150 is operated by the control system 180 in response to one or more signals received from one or more pressure sensors 182 coupled to the water line 140. For example, the first isolation valve 150 can be engaged once the pressure required for testing the process side 190 of the mechanical seal 116 is achieved, as detected by the fluid sensor 182 along the water line 140. In some implementations, the first isolation valve 150 can be manually operated by an operator of the test system 100 to selectively engage or disengage in order to control flow from the first fluid pump 110 through the water line 140 to the stuffing box 118.

As depicted in FIG. 2, the second isolation valve 151 is fluidly coupled to the second fluid pump 112 of the testing system 100 and is communicably coupled to the control system 180 (for example, through a control line). In some implementations, the second isolation valve 151 is configured to be operated by the control system 180 to selectively engage or disengage to control flow from the second fluid pump 112 through the oil fluid line 132 to mechanical seal 116. For example, engaging the second isolation valve 151 prevents fluid flow from the second fluid pump 112 into the mechanical seal 116 in order to isolate the mechanical seal 116 from the second fluid pump 112. In addition, by engaging the second isolation valve 151, the pressure within the mechanical seal 116 and applied to the barrier side 191 of the mechanical seal 116 is maintained if the mechanical seal 116 does not have any leaks.

In some implementations, the second isolation valve 151 is operated by the control system 180 in response to one or more signals received from one or more pressure sensors 184 coupled to the oil fluid line 132. For example, the second isolation valve 151 can be engaged once the pressure required for testing the barrier side 191 of the mechanical seal 116 is achieved, as detected by the fluid sensor 184 along the oil fluid line 134. In some implementations, the second isolation valve 151 can be manually operated by an operator of the test system 100 to selectively engage or disengage the second isolation valve 151 in order to control flow from the second fluid pump 112 through the oil fluid line 132 to the mechanical seal.

The control dashboard 108 also includes a set of flow control valves 152, 154, 156. The set of flow control valves 152, 154, 156 includes a pair of water flow control valves 152, 154 fluidly coupled to the first fluid pump 110 and the stuffing box 118. The water flow control valves 152, 154 are each configured to control the flow of fluid through the water line 140 to a stuffing box 118 coupled to the mounting ring 104 of the testing system 100. In some implementations, each of the flow control valves 152, 154, 156 are communicatively coupled to and control by the control system 180. In some implementations, an operator of the testing system 100 can manually control the flow control valves 152, 154, 156 to control fluid flow throughout the testing system 100.

A first water flow control valve 152 is configured to control fluid flow to a vertical seal stuffing box 118 and a second water flow control valve 154 is configured to control fluid flow to a horizontal seal stuffing box 118. For example, in some implementations, the mechanical seal 116 is vertically mounted to the mounting ring 104 and a vertical stuffing box is used to test the vertically-mounted mechanical seal 116, and the first water flow control valve 152 controls the flow of fluid from the first fluid pump 110 through the water line 140 to the stuffing box 118. In some implementations, as depicted in FIG. 1, the mechanical seal 116 is horizontally mounted on the mounting ring 104 and a horizontal stuffing box (such as stuffing box 118) is used to test the horizontally-mounted mechanical seal 116, and the second water flow control valve 154 controls the flow of fluid from the first fluid pump 110 through the water line 140 to the stuffing box 118.

In some implementations, each of the water flow control valves 152, 154 is communicatively coupled to the control system 180 (for example, through a control line). In some implementations, each of the water flow control valves 152, 154 can be manually operated an operator of the testing system 100 in order to control the flow through the water line 140. In some implementations, each of the water flow control valves 152, 154 can be operated by the control system 180 in response to one or more signals received from one or more pressure sensors 182 coupled to the water line 140. For example, an operator can set a target pressure or target pressure range to be applied to the stuffing box 118. As fluid is pumped to the stuffing box 118 via the water line 140, the pressure sensor(s) 182 measure the pressure in the water line 140 proximate the connection to the stuffing box 118 and transmit the detected pressure to the control system 180. Based on the pressure detected by the pressure sensor(s) 182, the control system 180 determines whether the pressure applied to the stuffing box 118 is outside the target pressure or target pressure range set by the operator. In response to detecting that the pressure in stuffing box 118 is outside the target pressure or target pressure range, the control system 180 can operate the water flow control valves 152, 154 to adjust the fluid flow through the water line 140 in order to adjust the pressure provided through the water line 140 to the stuffing box 118. In some implementations, the control system 180 operates each of the control valves 152, 154 by causing a power source to transmit an electrical signal to a valve 152, 154 that causes the respective valve 152, 154 to either open or close (fully or partially) in order to adjust the pressure provided through the water line 140 to the stuffing box 118.

The control dashboard 108 also includes an oil flow control valve 156 fluidly coupled to the second fluid pump 112 and the mechanical seal 116. The oil flow control valve 156 is configured to control the fluid flow from the second fluid pump 112 to the mechanical seal 116 via the oil fluid line 132. For example, the control valve 156 can be adjusted to control the flow of oil through the oil fluid line 132 to the mechanical seal 116.

In some implementations, the oil flow control valve 156 is communicatively coupled to the control system 180 (for example, through a control line). In some implementations, oil flow control valve 156 is operated by the control system 180 in response to one or more signals received from one or more pressure sensors 184 coupled to the oil fluid line 132. For example, an operator can set a target pressure or target pressure range to be applied to the mechanical seal 116. As fluid is pumped through the oil fluid line 132 to the mechanical seal 116, the pressure sensor(s) 184 measure the pressure in the oil fluid line 132 proximate the connection to the mechanical seal 116. The pressure sensors(s) 184 transmit the detected pressure in the oil fluid line 132 to the control system 180. Based on the pressure detected by the pressure sensor(s) 184 in the oil fluid line 132, the control system 180 determines whether the pressure applied to the mechanical seal 116 is outside the target pressure or target pressure range. In response to detecting that the pressure in the oil fluid line 132 is outside the target pressure or target pressure range, the control system 180 can operate the control valve 156 to adjust the fluid flow through the oil fluid line 132 in order to adjust the pressure provided to the mechanical seal 116. In some implementations, the control system 180 operates the control valve 156 by causing a power source to transmit an electrical signal to the control valve 156 that causes the control valve 156 to either open or close (fully or partially) to adjust the pressure provided to the mechanical seal 116 through the oil fluid line 132.

In addition to the isolation valves 150, 151 and the control valves 152, 154, 156, the control dashboard includes several pressure gauges 158, 160, 162. The pressure gauges 158, 160, 162 are fluidically coupled to and configured to display the pressure within various fluid lines of the testing system 100. For example, an operator of the testing system 100 can use the pressure gauges 158, 160, 162 to monitor the pressure being applied to a mechanical seal 116 and a stuffing box 118 coupled to the oil fluid line 132 and the water line 140, respectively, of the testing system 100. In some implementations, the pressure gauges 158,160, 162 are configured to display pressure measurements in units of pound-force per square inch gauge (psig).

Pressure gauge 158 is configured to display the fluid pressure being applied to a vertical stuffing box 118 when a vertical stuffing box 118 is used in the testing system 100. Pressure gauge 160 is configured to display the fluid pressure being applied to a horizontal stuffing box 118 when a horizontal stuffing box 118 is used in the testing system 100. In some implementations, the pressure gauges 158, 160 are each communicably coupled to the pressure sensor 182 along the water line 140. For example, the pressure sensor 182 measures the pressure being applied to the stuffing box 118 via the water line 140, and the pressure gauges 158, 160 each display the pressure being applied to the stuffing box 118 as measured by the pressure sensor 182.

Similarly, pressure gauge 162 is configured to display the fluid pressure being applied to the mechanical seal 116. The pressure gauge 162 is communicably coupled to the pressure sensor 184 along the oil fluid line 132. For example, the pressure sensor 184 measures the pressure being applied to the mechanical seal 116 via the oil fluid line 132, and the pressure gauge 162 displays the pressure being applied to the mechanical seal 116 as measured by the pressure sensor 184.

In some implementations, the pressure sensors 182, 184 are configured to transmit signals to the control system 180 in realtime. Realtime monitoring allows continuous monitoring to better control the leak testing process. For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit (or a combination of these or other functions) the data.

Figure 3:
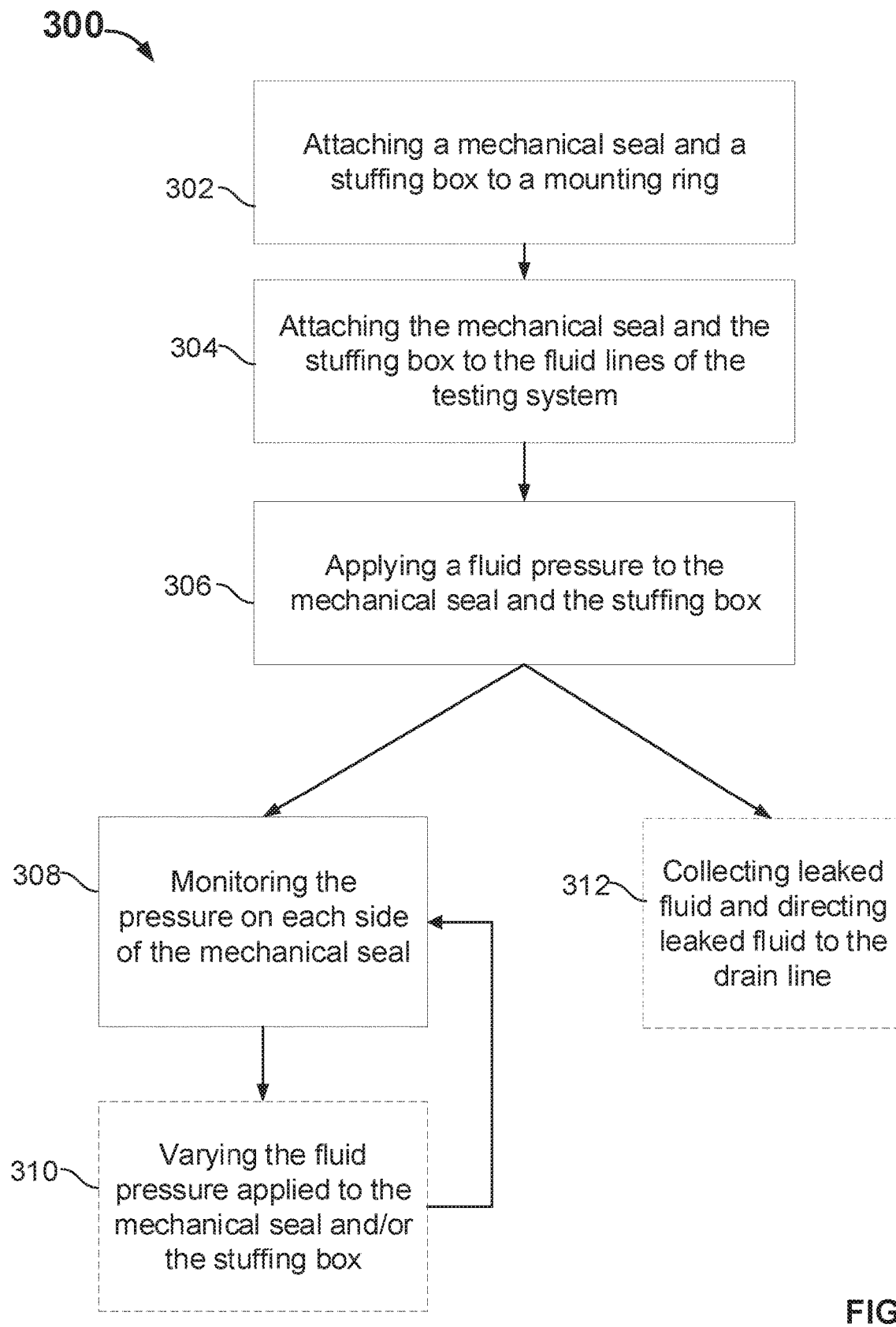
FIG. 3 is a flowchart of an example process of testing a mechanical seal.

A method of testing a mechanical seal using the testing system 100 of FIG. 1 will now be described with reference to FIGS. 1-3. In order to test a mechanical seal 116, the mechanical seal 116 and the stuffing box 118 are each attached to a mounting ring 104 of the testing system 100 as described above (302). In some implementations, the mechanical seal 116 and the stuffing box 118 are attached tightly enough to the mounting ring 104 to form a seal against the respective sides 120, 122 of the mounting ring 104. The mechanical seal 116 is attached to the mounting ring 104 on the process side 190 of the mechanical seal 116, as depicted in FIG. 1. As previously discussed, the mounting ring 104 is configured such that fluid cannot pass between the stuffing box 118 and mechanical seal 116 through the mounting ring 104.

Once attached to the mounting ring 104, the mechanical seal 116 and the stuffing box 118 are coupled to fluid lines 132, 140, respectively, of the testing system 100 as described above (304). For example, as depicted in FIG. 1, the mechanical seal 116 is attached to the oil fluid line 132 of the testing system 100 using the port 136 on the mechanical seal 116. As depicted in FIG. 1, the stuffing box 118 is attached to the water line 140 of the testing system 100 using the port 144 on the stuffing box 118.

Once the mechanical seal 116 and stuffing box 118 are each attached to the mounting ring 104 and the respective fluid lines 132, 140 of the testing system 100, the control system 180 operates the fluid pumps 110, 112 to apply a fluid pressure to the mechanical seal 116 and the stuffing box 118 (306). Pressure is applied to the stuffing box 118 and the mechanical seal 116 by operating the first fluid pump 110 and second fluid pump 112 to pump fluids to the stuffing box 118 and mechanical seal 116, respectively.

For example, in order to apply a fluid pressure to the barrier side 191 of the mechanical seal 116, the control system 180 engages the second fluid pump 112 to pump fluid (for example, oil) through the oil fluid line 132 to the mechanical seal 116. In addition, the control system 180 controls the oil flow control valve 156 coupled to oil fluid line 132 to allow fluid to flow through the oil fluid line 132 to the mechanical seal 116. As fluid flows through the oil fluid line 132 into the mechanical seal 116 and fills the internals of the mechanical seal 116, the fluid pressure within the oil fluid line 132 and the mechanical seal 116 increases and applies pressure to the barrier side 191 of the mechanical seal.

Similarly, in order to apply pressure to a fluid pressure to the process side 190 of the mechanical seal 116, the control system 180 engages the first fluid pump 110 to pump fluid (for example, water) through the water line 140 to the stuffing box 118. In addition, the control system 180 controls the water flow control valves 152, 154 coupled to water line 140 to allow fluid to flow through the water line 140 to the stuffing box 118. As fluid flows through the water line 140 into the stuffing box 118 and fills the stuffing box 118, the fluid pressure within the water line 140 and stuffing box 118 increases. As the fluid pressure within the stuffing box 118 increases, pressure is applied by the stuffing box 118 to the mounting ring 104. The mounting ring 104 then transfers the pressure applied by the stuffing box 118 to the process side 190 of the mechanical seal 116 and applies pressure to the process side 190 of the mechanical seal 116.

In some implementations, the first fluid pump 110 and the second fluid pump 112 are configured to apply a fluid pressure to the stuffing box 118 and the mechanical seal 116, respectively, in a range of about 1 psig to about 600 psig. In some implementations, the first and second fluid pumps 110, 112 are each configured to deliver a fluid pressure greater than 600 psig (for example, 1000 psig).

In some implementations fluid pressure is applied to mechanical seal 116 and the stuffing box 118 simultaneously. For example, the control system 180 can engage both the first fluid pump 110 and the second fluid pump 112 to pump fluid to the stuffing box 118 and the mechanical seal 116, respectively, at the same time. By applying pressure to the mechanical seal 116 and the stuffing box 118 at the same time, both the barrier side 191 and the process side 190 of the mechanical seal 116 can be tested for leaks simultaneously.

In addition, in some implementations, the first fluid pump 110 and the second fluid pump 112 can be controlled independently to apply different fluid pressures to the stuffing box 118 and the mechanical seal 116, respectively, in order to apply a different pressure to the barrier side 191 of the mechanical seal 116 and the process side 190 of the mechanical seal 116, respectively. By applying a different amount of pressure to the mechanical seal 116 and the stuffing box 118 simultaneously, the testing system 100 enables a differential pressure to be applied across the mechanical seal 116. In some implementations, an operator can indicate a particular differential pressure or range of differential pressures to apply across the mechanical seal 116 during testing, and the control system 180 controls the flow control valves 152, 154, 156, the second fluid pump 112, and the first fluid pump 110 to pump fluid to the mechanical seal 116 and the stuffing box 118, respectively, to produce the differential pressure or range of differential pressures indicated by the operator.

By simultaneously pressurizing the mechanical seal 116 and the stuffing box 118 in order to apply pressure to both sides 190, 191 of the mechanical seal 116 simultaneously, the spring forces of the mechanical seal 116 can be effectively tested. For example, as previously discussed, the mechanical seal 116 can include a set of springs that are used to maintain the required closing forces of the mechanical seal 116. When one or more of the springs in the mechanical seal 116 is not properly positioned (for example, due to improper installation of the spring), the spring force across the face of the mechanical seal 116 may be unequally distributed, causing the mechanical seal 116 to leak. By applying pressure to both the process side 190 and the barrier side 191 of the mechanical seal 116, differential pressure can be applied across the seal 116. Leaks occurring on either the barrier side 191 or process side 190 of the mechanical seal 116 when a specified differential pressure is applied to each side of the mechanical seal 116 can indicate that the spring tension of the mechanical seal 116 is not distributed homogenously across the mechanical seal 116. The opening and closing forces of the mechanical seal 116 can be negatively impacted by a nonhomogeneous distribution of spring forces, which can cause the seal 116 to leak under certain applications of pressure on the mechanical seal 116. Therefore, by applying pressure to and testing both the process side 190 and barrier side 191 of the mechanical seal 116 simultaneously, the opening and closing forces of the mechanical seal 116 can be effectively tested.

In some implementations, the control system 180 controls the second fluid pump 112 and oil flow control valve 156 to continue to pump fluid from the second fluid pump 112 through the oil fluid line 132 to mechanical seal 116 until the pressure sensor 184 along the oil fluid line 132 indicates that a predetermined pressure has been reached within the mechanical seal 116. For example, an operator of the system 100 can provide a target pressure to be applied to the barrier side 191 of the mechanical seal 116. In order to increase the pressure within the mechanical seal 116, the control system 180 controls the oil flow control valve 156 along to oil fluid line 132 to open and controls the second fluid pump 112 to pump fluid (such as oil) through the oil fluid line 132 to the mechanical seal 116. In some implementations, the second fluid pump 112 is coupled to an oil tank 114 of the system 100, and the second fluid pump 112 is configured to pump oil from the oil tank 114 to the mechanical seal 116.

As the second fluid pump 112 pumps fluid to the mechanical seal 116, the pressure sensor 184 transmits signals to the control system 180 indicating the pressure in the oil fluid line 132 proximate the mechanical seal 116. The control system 180 controls the second fluid pump 112 to continue pumping fluid to the mechanical seal 116 and controls the oil flow control valve 156 and second isolation valve 151 to remain open until the signals from the pressure sensor 184 indicate that target pressure has been reached within the mechanical seal 116. Once the target pressure has been reached within the mechanical seal 116, as detected by the pressure sensor 184, the control system 180 can control the oil flow control valve 156 and second isolation valve 151 to close in order to prevent additional fluid from flowing into the mechanical seal 116 from the oil fluid line 132 and isolate the pressurized mechanical seal 116.

Similarly, an operator of the system 100 can provide a target pressure to be applied to the stuffing box 118 (which is then transferred to the process side 190 of the mechanical seal 116 via the mounting ring 104, as described above), and the control system 180 can control the water flow control valve(s) 152, 154 along the water line 140 and the first isolation valve 150 to open and the first fluid pump 110 to pump fluid (such as water) to the stuffing box 118 to increase the pressure within the stuffing box 118. As the first fluid pump 110 pumps fluid to the stuffing box 118, the pressure sensor 182 along the water line 140 transmits signals to the control system 180 indicating the pressure in the water line 140 proximate the stuffing box 118. The control system 180 controls the first fluid pump 110 to continue pumping fluid to the stuffing box 118 and controls the water flow control valve(s) 152, 154 and first isolation valve 150 to remain open until the signals received from the pressure sensor 182 indicate that target pressure has been reached within the stuffing box 118. Once the target pressure has been reached within the stuffing box 118, as detected by the pressure sensor 182, the control system 180 can control the water flow control valve(s) 152, 154 and first isolation valve 150 to close in order to prevent additional fluid from flowing into the stuffing box 118 from the oil water line 140 and isolate the pressurized stuffing box 118, which applies pressure to the process side 190 of the mechanical seal 116 through the mounting ring 104.

In some implementations, an operator can provide a target differential pressure to be applied across the mechanical seal 116, and the control system 180 controls the isolation valves 150, 151, flow control valves 152, 154, 156 and both the first fluid pump 110 and the second fluid pump 112 to apply fluid pressure to the stuffing box 118 and the mechanical seal 116, respectively, in order to generate the target differential pressure across the mechanical seal 116, as determined based on the pressure signals received from the pressure sensors 182, 184. Once the target differential pressure has been reached, as measured based on the fluid pressure applied to the mechanical seal 116 and stuffing box 118, the control system 180 can control the isolation valves 150, 151 and the flow control valves 154, 512, 156 to the close in order to prevent additional fluid from flowing into the mechanical seal 116 and the stuffing box 118.

Once the target pressure has been applied to each side 190, 191 of the mechanical seal 116 through pressurization of the stuffing box 118 and mechanical seal 116, respectively, the control system 180 monitors the pressure on each side of the mechanical seal 116 (308). For example, the control system 180 monitors the pressure in the oil fluid line 132, as measured by pressure sensor 184, in order to determine the pressure within the mechanical seal 116, and the control system 180 monitors the pressure in the water line 140, as measured by pressure sensor 182, in order to determine the pressure within the stuffing box 118.

As previously discussed, in some implementations, once the target pressure for both the mechanical seal 116 and the stuffing box 118 has been reached, as determined by the control system 180 based on the signals received from the pressure sensors 182, 184, the control system 180 engages the isolation valves 150, 151 to isolate the stuffing box 118 and the mechanical seal 116 from the first fluid pump 110 and second fluid pump 112, respectively, such that no additional pressure is applied either side of the mechanical seal 116. By isolating the mechanical seal 116 and the stuffing box 118 from the fluid pumps 110, 112 once a target pressure has been applied to each side of the mechanical seal 116, the mechanical seal 116 can be effectively monitored for leaks.

For example, once the target pressure has been reached in the mechanical seal 116, and the mechanical seal 116 has been isolated from the second fluid pump 112, the pressure sensor 184 within the oil fluid line 132 can measure any changes in pressure in the mechanical seal 116. A drop in pressure within the mechanical seal 116 when the mechanical seal 116 is isolated from the second fluid pump 112 can indicate that the mechanical seal 116 is leaking under the applied target pressure, as fluid leaking out of the mechanical seal 116 will result in reduced pressure within the mechanical seal 116. For example, a drop in pressure within the oil fluid line 132 proximate the mechanical seal 116 when the mechanical seal 116 is isolated from the second fluid pump 112 can indicate that the barrier side 191 of the mechanical seal 116 is leaking under the applied target pressure.

Similarly, once the target pressure has been reached in the stuffing box 118 and the stuffing box 118 has been isolated from the first fluid pump 110, the pressure sensor 182 in the water line 140 can measure any changes in pressure within the stuffing box 118. A drop in pressure within the stuffing box 118 when the stuffing box 118 is isolated from the first fluid pump 110 can indicate that the mechanical seal 116 is leaking under the applied target pressure, as fluid leaking out of the mechanical seal 116 will result in a decreased pressure applied by the mechanical seal 116 through the mounting ring 104 to the stuffing box 118. In some implementations, a drop in pressure within the water line 140 proximate the stuffing box 118 when the stuffing box 118 is isolated from the first fluid pump 110 can indicate that the process side 190 of the mechanical seal 116 is leaking under the applied target pressure. Therefore, by applying a target pressure to the mechanical seal 116 and the stuffing box 118, isolating the mechanical seal 116 and stuffing box 118, and monitoring the pressure within the fluid lines 132, 140 coupled to the mechanical seal 116 and the stuffing box 118, respectively, leaks within the mechanical seal 116 can be effectively detected, and the side(s) 190, 191 of the mechanical seal that are leaking, if any, can be determined.

In some implementations, the fluid pressure applied to the mechanical seal 116 and/or the stuffing box 118 is varied during the course of testing the mechanical seal 116 to adjust the pressure applied across the mechanical seal 116 (310). For example, an operator can provide a range of target fluid pressures to be applied the stuffing box 118 and the mechanical seal 116 by the fluid pumps 110, 112, respectively. In order to test the selected range of pressures, the control system 180 can control the flow control valves 152, 154, 156, the second fluid pump 112, and the first fluid pump 110 to adjust the pressure applied to the mechanical seal 116 and the stuffing box 118, respectively, in order to test the entire range of pressure. In some implementations, after each change in pressure, the stuffing box 118 and mechanical seal 116 can be isolated from the fluid pumps 110, 112, as discussed above, and the pressure within the mechanical seal 116 and the stuffing box 118 can be measured by the pressure sensors 182, 184 along the water line 140 and the oil fluid line 132 to detect any leaks occurring within the mechanical seal 116 under the adjusted pressure. By varying the fluid pressure applied to the mechanical seal 116 and the stuffing box 118, a variety of differential pressures and sealing conditions can be tested.

In some implementations, the control system 180 controls the first fluid pump 110 and the second fluid pump 112 to apply pressure to the stuffing box 118 and the mechanical seal 116 independently. For example, pressure can be applied to the barrier side 191 of the mechanical seal 116 using the second fluid pump 112 while no pressure is applied to the stuffing box 118 or process side 190 of the mechanical seal 116, and the pressure within the mechanical seal 116 can be monitored to test the mechanical seal 116 for leaks from barrier side 191. Once the barrier side 191 of the mechanical seal 116 has been tested, the pressure applied to the mechanical seal 116 can be released (for example, by draining the fluid from the mechanical seal 116), and fluid pressure can be applied to the stuffing box 118 using the first fluid pump 110, and the pressure within the stuffing box 118 can be monitored to test the mechanical seal 116 for leaks from the process side 190 of the mechanical seal 116.

During testing, the pressure in the mechanical seal 116 and in the stuffing box 118 is monitored for a predetermined amount of time in order to determine whether the mechanical seal 116 is leaking. In some implementations, the pressure within the mechanical seal 116 and within the stuffing box 118 is monitored for a about 45 minutes to about 75 minutes (for example, 60 minutes) in order to determine whether the mechanical seal 116 is leaking. In some implementations, an operator 180 selects the amount of time that the pressure within the mechanical seal 116 and within the stuffing box 118 is monitored to test for leaks.

In some implementations, the mechanical seal 116 is considered fit for use if the pressure within the mechanical seal 116 and the pressure within the stuffing box 118 each decrease during the testing period by an amount that is less than a predetermined threshold. For example, if the pressure within the mechanical seal 116 and the pressure with the stuffing box 118 each decrease during the testing period by an amount less than about 10%, the mechanical seal 116 is considered fit for use in field applications.

In some implementations, any fluids leaked from the mechanical seal 116 and/or stuffing box 118 are collected on the testing table 106 and directed to a drain line (312). For example, as previously discussed, when attached to the mounting ring 104, the mechanical seal 116 and the stuffing box 118 are each positioned over the surface 124 of the testing table 106. As such, if either of the mechanical seal 116 or the stuffing box 118 experiences a leak as fluid is pumped to the mechanical seal 116 and the stuffing box 118 during testing, the leaked fluid will fall and collect onto the surface 124 of the testing table 106. The outer lip 126 of the testing table 106 prevents any of the fluids leaked onto the surface 124 from running off the surface 124 of the testing table 106. Further, as previously discussed the surface 124 of the testing table 106 defines an opening 128, and the opening in the surface 124 is fluidly coupled to a drain line 130. As fluid is leaked from the mechanical seal 116 and/or the stuffing box 118 onto the surface 124 of the testing table 106, the leaked fluid drains through the opening 128 in the surface 124 into the drain line 130. In some implementations, the drain line 130 is coupled to the oil tank 114, and the fluid draining through the drain line 130 is provided to the oil tank 114 for recirculation through the system 100. In some implementations, the drain line drains the leaked fluid to an oil sump or utility drainage system (not shown) coupled to the drain line 130.

Figure 4:
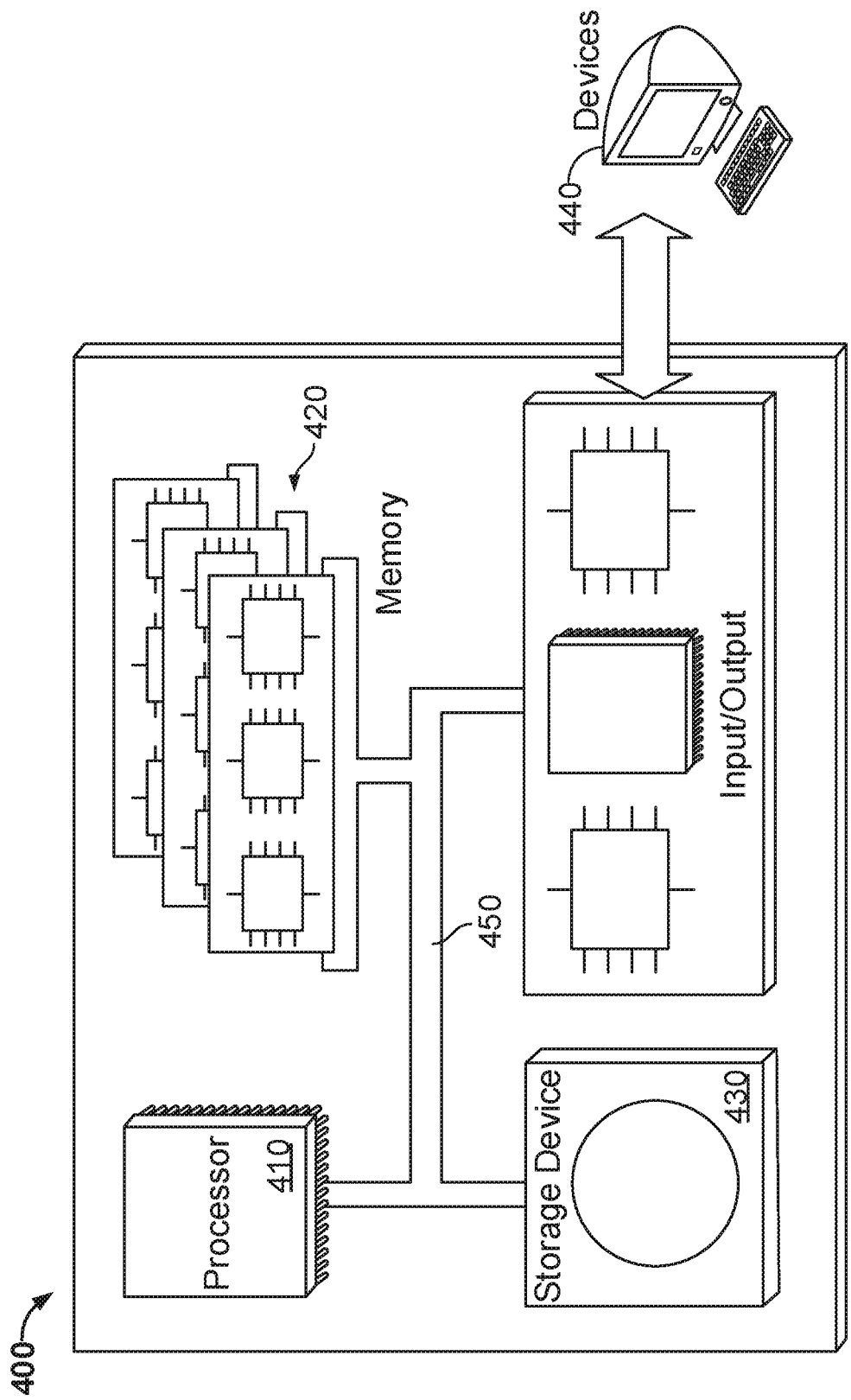
FIG. 4 is a schematic illustration of an example control system for a mechanical seal testing system according to the present disclosure.

FIG. 4 is a schematic illustration of an example controller 400 (or control system 400) for a system for forming a subterranean cavern. For example, the controller 400 can be used for the operations described previously, for example as or as part of the control system 180, or other controllers described herein. For example, the controller 400 can be communicably coupled with, or as a part of, pumps 110, 112 and pressure sensors 182, 184 for a mechanical seal testing system 100, as described herein.

The controller 400 is intended to include various forms of digital computers, such as printed circuit boards (PCB), processors, digital circuitry, or other hardware. Additionally the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor can be designed using any of a number of architectures. For example, the processor 410 can be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 can be a floppy disk device, a hard disk device, an optical disk device, or a tape device.

The input/output device 440 provides input/output operations for the controller 400. In one implementation, the input/output device 440 includes a keyboard, a pointing device, or both. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While certain implementations have been described above, other implementations are possible.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A mechanical seal testing system comprising:
   a mounting ring comprising:
      a first side configured to couple to a mechanical seal, the mechanical seal configured to couple to an oil pump; and
      a second side configured to couple to a stuffing box, the stuffing box configured to couple to a water pump; and
   a testing table comprising a surface configured to collect fluid leaked by the mechanical seal or the stuffing box, the mounting ring being coupled to the surface of the testing table.

2. The mechanical seal testing system of claim 1, wherein the surface of the testing table defines an opening coupled to a drain line, the opening configured to channel fluid collected on the surface to the drain line.

3. The mechanical seal testing system of claim 1, further comprising a plurality of mechanical fasteners configured to affix the stuffing box and the mechanical seal to the mounting ring.

4. The mechanical seal testing system of claim 1, further comprising a controller communicably coupled to the water pump and the oil pump, the controller configured to control a fluid pressure provided by the water pump to the stuffing box and a fluid pressure provided by the oil pump to the mechanical seal.

5. The mechanical seal testing system of claim 4, wherein the controller is configured to control the fluid pressure provided by the water pump to the stuffing box and the fluid pressure provided by the oil pump to the mechanical seal independently.

6. The mechanical seal testing system of claim 5, further comprising:
   a first pressure sensor coupled to a first fluid line, the first fluid line fluidly coupling the water pump to the stuffing box, the first pressure sensor configured to measure a pressure in the first fluid line; and
   a second pressure sensor coupled to a second fluid line, the second fluid line fluidly coupling the oil pump to the mechanical seal, the second pressure sensor configured to measure a pressure in the second fluid line.

7. The mechanical seal testing system of claim 6, wherein:
   the first pressure sensor is communicably coupled to the controller and configured to transmit signals to the controller indicating the fluid pressure in the first fluid line; and
   the second pressure sensor is communicably coupled to the controller and configured to transmit signals to the controller indicating the fluid pressure in the second fluid line.

8. The mechanical seal testing system of claim 6, further comprising a dashboard coupled to the testing table, the dashboard comprising:
   a first pressure gauge coupled to the first pressure sensor and configured to display the fluid pressure in the first fluid line; and
   a second pressure gauge coupled to the second pressure sensor and configured to display the fluid pressure in the second fluid line.

9. The mechanical seal testing system of claim 8, wherein the dashboard further comprises:
   a first control valve fluidly coupled to the first fluid line and configured to control a flow of fluid through the first fluid line; and
   a second control valve fluidly coupled to the second fluid line and configured to control a flow of fluid through the second fluid line.

10. A mechanical seal testing method comprising:
    applying a fluid pressure to a mechanical seal attached to a first side of a mounting ring;
    applying a fluid pressure to a stuffing box attached to a second side of the mounting ring, the second side opposite the first side; and
    monitoring the mechanical seal and the stuffing box to detect leaks at the mechanical seal.

11. The method of claim 10, wherein applying a fluid pressure to the mechanical seal comprises controlling an oil pump to flow oil from the oil pump to the mechanical seal through a fluid line attached to the mechanical seal to apply a pressure to a barrier side of the mechanical seal.

12. The method of claim 10, wherein applying a fluid pressure to the stuffing box comprises controlling a water pump to flow water from the water pump to the stuffing box through a fluid line attached to the stuffing box, wherein the fluid pressure applied to the stuffing box is transferred through the mounting ring and, in response, the mounting ring applies a pressure to a process side of the mechanical seal.

13. The method of claim 10, wherein:
    applying a fluid pressure to the mechanical seal comprises controlling an oil pump to flow oil from the oil pump to the mechanical seal through a first fluid line attached to the mechanical seal until a pressure sensor coupled to the first fluid line detects that the pressure in the mechanical seal is equal to a first target pressure; and
    applying a fluid pressure to the stuffing box comprises controlling a water pump to flow water from the water pump to the stuffing box through a second fluid line attached to the stuffing box until a pressure sensor coupled to the second fluid line detects that the pressure in the stuffing box is equal to a second target pressure.

14. The method of claim 10, wherein the fluid pressure applied to the mechanical seal and the fluid pressure applied to the stuffing box are applied simultaneously.

15. The method of claim 14, wherein the fluid pressure applied to the mechanical seal is not equal to the fluid pressure applied to the stuffing box.

16. The method of claim 10, further comprising:
    adjusting at least one of the fluid pressure applied to the mechanical seal and the fluid pressure applied to the stuffing box; and
    monitoring the mechanical seal and the stuffing box to detect leaks at the mechanical seal at the adjusted fluid pressure.

17. The method of claim 10, wherein monitoring the mechanical seal and the stuffing box to detect leaks at the mechanical seal comprises:
    monitoring a pressure in a first fluid line coupled to the mechanical seal, a decrease in pressure in the first fluid line indicating a leak on a barrier side of the mechanical seal; and
    monitoring a pressure in a second fluid line coupled to the stuffing box, a decrease in pressure in the second fluid line indicating a leak on a process side of the mechanical seal.

18. The method of claim 17, wherein monitoring the mechanical seal and the stuffing box to detect leaks at the mechanical seal comprises:
    isolating the mechanical seal from a pump applying pressure to the mechanical seal; and isolating the stuffing box from a pump applying pressure to the stuffing box.

19. The method of claim 10, further comprising:

collecting fluid leaked by the mechanical seal or the stuffing box onto a surface of a testing table, the mounting ring coupled to the testing table; and directing the leaked fluid through an opening in the surface of the testing table, the opening coupled to a drain line.

20. A mechanical seal testing system comprising:

a mounting ring comprising:
- a first side configured to couple to a mechanical seal; and
- a second side configured to couple to a stuffing box;

a testing table comprising a surface configured to collect fluid leaked by the mechanical seal or the stuffing box, the mounting ring being coupled to the surface of the testing table;

an oil pump configured to fluidly couple to and pressurize the mechanical seal; and a water pump configured to fluidly couple to and pressurize the stuffing box.

\* \* \* \* \*